(12) United States Patent
Chu et al.

(10) Patent No.: US 9,179,394 B2
(45) Date of Patent: Nov. 3, 2015

(54) APPARATUS AND METHOD FOR COORDINATED SENSING OF WIRELESS DEVICES IN A COMMUNICATION SYSTEM

(75) Inventors: Liwen Chu, San Jose, CA (US); Wendong Hu, San Jose, CA (US); George Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 1879 days.

(21) Appl. No.: 11/974,119

(22) Filed: Oct. 11, 2007

(65) Prior Publication Data

US 2008/0096542 A1 Apr. 24, 2008

Related U.S. Application Data

(60) Provisional application No. 60/853,278, filed on Oct. 20, 2006.

(51) Int. Cl.
*H04W 24/00* (2009.01)
*H04W 48/12* (2009.01)

(52) U.S. Cl.
CPC ................... *H04W 48/12* (2013.01)

(58) Field of Classification Search
CPC ..... H04W 48/12; H04W 24/00; H04W 56/00; H04W 74/08
See application file for complete search history.

(56) References Cited

U.S. PATENT DOCUMENTS

| | | | | |
|---|---|---|---|---|
| 5,991,287 A * | 11/1999 | Diepstraten et al. | ........... | 370/338 |
| 6,947,768 B2 * | 9/2005 | Adachi et al. | ................. | 455/560 |
| 7,072,648 B2 * | 7/2006 | Ichikawa | ...................... | 455/425 |
| 7,406,336 B2 * | 7/2008 | Astely et al. | ................ | 455/562.1 |
| 7,650,150 B1 * | 1/2010 | Gerakoulis et al. | ........... | 455/450 |
| 2003/0022692 A1 * | 1/2003 | Ueno | .............................. | 455/561 |
| 2003/0202498 A1 * | 10/2003 | de Heer et al. | ................. | 370/338 |
| 2005/0013283 A1 * | 1/2005 | Yoon et al. | ..................... | 370/350 |
| 2007/0042798 A1 * | 2/2007 | Chen et al. | .................... | 455/522 |
| 2007/0248076 A1 * | 10/2007 | Ji et al. | ........................... | 370/350 |
| 2008/0225878 A1 * | 9/2008 | Cordeiro et al. | .............. | 370/437 |
| 2010/0061256 A1 * | 3/2010 | Ang et al. | ...................... | 370/252 |

FOREIGN PATENT DOCUMENTS

EP 1 355 450 A1 10/2003

OTHER PUBLICATIONS

U.S. Appl. No. 60/809,040, filed May 2006, Ang.*

(Continued)

*Primary Examiner* — Steven H Nguyen
(74) *Attorney, Agent, or Firm* — Seed IP Law Group PLLC (57) ABSTRACT

A first base station is associated with a first quiet period, and a second base station is associated with a second quiet period. The quiet periods are coordinated so that an amount of overlap between the quiet periods is acceptable. For example, the quiet periods could be coordinated so that no overlap exists between the quiet periods. During the first quiet period, the first base station and/or an associated device (such as a CPE served by the first base station) performs in-band sensing to detect wireless devices that use a first frequency or channel also used by the first base station. During the second quiet period, the first base station and/or a coordinate device (such as a CPE served by the first base station and assisting the second base station) performs out-band sensing to detect wireless devices that use a second frequency or channel also used by the second base station.

28 Claims, 4 Drawing Sheets

(56) References Cited

OTHER PUBLICATIONS

Wendong Hu et al., "Connection Based Over-the-air Inter Base Station Communications: Logical Control Connection and its Application to Credit Token based Rental Protocol," STMicroelectronics, Jul. 2006, 17 pages.

"Draft Standard for Wireless Regional Area Networks Part 22: Cognitive Wireless RAN Medium Access Control (MAC) and Physical Layer (PHY) specifications: Policies and procedures for operation in the TV Bands," IEEE May 2006, 304 pages.

"Local and metropolitan area networks, Part 16: Air Interface for Fixed and Mobile Broadband Wireless Access Systems, Amendment for Improved Coexistence Mechanisms for License-Exempt Operation," IEEE Aug. 2006, 172 pages.

Benko, J. et al., "A PHY/MAC Proposal for IEEE 802.22 WRAN Systems Part 2: The Cognitive MAC", Internet Citation, Feb. 23, 2006, 111 pages.

European Search Report issued in European Patent Application No. EP 07 25 4157 dated Feb. 19, 2008.

\* cited by examiner

APPARATUS AND METHOD FOR COORDINATED SENSING OF WIRELESS DEVICES IN A COMMUNICATION SYSTEM

CROSS-REFERENCE TO RELATED APPLICATIONS

This application claims priority under 35 U.S.C. §119(e) to U.S. Provisional Patent Application No. 60/853,278 filed on Oct. 20, 2006, which is hereby incorporated by reference.

TECHNICAL FIELD

This disclosure is generally directed to communication systems and more specifically to an apparatus and method for coordinated sensing of wireless devices in a communication system.

BACKGROUND

Many different types of wireless communication systems include base stations or access points in wireless local area networks (WLANs). The base stations or access points typically include components for wirelessly transmitting and receiving information. The base stations or access points typically interact with wireless devices (such as mobile telephones and computing devices) to provide wireless services (such as wireless voice and data services) to the wireless devices. Often times, the base stations or access points "overlap," which means that multiple base stations or access points have overlapping coverage areas and can provide service to the same physical area. In this document, the phrase "base station" and its derivatives may be used to collectively refer to base stations, access points, and other similar structures.

Communication systems routinely engage in various sensing activities to identify sources of interference that can interrupt or degrade wireless communications. For example, in a wireless regional area network (WRAN), base stations often need to engage in "incumbent user" sensing. In these or other types of networks, the base stations may represent transmitters having a lower priority or right to use a particular wireless frequency or frequency channel. Other devices called "incumbent users" typically represent transmitters having a higher priority or right to use a particular wireless frequency or frequency channel. As a specific example, a television broadcaster may represent an incumbent user having a higher priority to use a particular wireless frequency or frequency channel.

The base stations in these or other types of networks often need to sense whether they are or could be interfering with an incumbent user. This may involve simply detecting the presence of an incumbent user that could experience interference due to the operation of one or more of the base stations. If an incumbent user having a higher priority to a frequency or frequency channel is detected, a base station could take suitable corrective action. For instance, the base station could change the wireless frequency or frequency channel it uses to communicate with wireless devices in the network. Also, the base stations may engage in incumbent user sensing to determine if a particular wireless frequency or frequency channel is currently available for use by the base stations (i.e. no incumbent users are detected on a particular wireless frequency or frequency channel).

SUMMARY

This disclosure provides an apparatus and method for coordinated sensing of wireless devices in a communication system.

In a first embodiment, a method includes identifying one or more first quiet periods associated with a first base station and identifying one or more second quiet periods associated with a second base station. The method also includes determining whether an amount of overlap between the first and second quiet periods is acceptable. In addition, the method includes using the first and second quiet periods to sense wireless devices when the amount of overlap between the first and second quiet periods is acceptable.

In particular embodiments, the amount of overlap is acceptable only when no overlap exists between the first and second quiet periods.

In other particular embodiments, the first base station is associated with a first decision time related to the one or more first quiet periods, and the second base station is associated with a second decision time related to the one or more second quiet periods. The method also includes determining whether the first decision time is earlier than the second decision time when the amount of overlap between the first and second quiet periods is not acceptable. When the first decision time is earlier than the second decision time, the information associated with the one or more first quiet periods may be rebroadcast from the first base station (the information having been broadcast earlier). When the first decision time is later than the second decision time, one or more new first quiet periods associated with the first base station may be identified, and information associated with the one or more new first quiet periods may be broadcast from the first base station.

In yet other particular embodiments, a coordinate device is served by the first base station and assists the second base station. The method also includes selecting the coordinate device from among a plurality of devices. The coordinate device is selected based on the coordinate device being located in a coverage area served by both the first and second base stations and away from an interference contour associated with the second base station.

In still other particular embodiments, a coordinate device is served by the first base station and assists the second base station. The method further includes setting a detection distance of the coordinate device. The detection distance is set so that a detection area associated with the coordinate device is substantially within an interference contour associated with the second base station.

In a second embodiment, an apparatus includes a memory configured to store information identifying one or more first quiet periods associated with a first base station and information identifying one or more second quiet periods associated with a second base station. The apparatus also includes a controller configured to determine whether an amount of overlap between the first and second quiet periods is acceptable and to initiate sensing of wireless devices using the first and second quiet periods when the amount of overlap between the first and second quiet periods is acceptable.

In a third embodiment, a computer program is embodied on a computer readable medium. The computer program includes computer readable program code for identifying one or more first quiet periods associated with a first base station and identifying one or more second quiet periods associated with a second base station. The computer program also includes computer readable program code for determining whether an amount of overlap between the first and second quiet periods is acceptable. The computer program further includes computer readable program code for initiating sensing of wireless devices using the first and second quiet periods when the amount of overlap between the first and second quiet periods is acceptable.

In a fourth embodiment, an apparatus includes a transceiver configured to communicate wirelessly with a first base station. The apparatus also includes a controller configured to perform (i) in-band sensing of wireless devices during one or more first quiet periods associated with the first base station and (ii) out-band sensing of wireless devices during one or more second quiet periods associated with a second base station. The first and second quiet periods represent non-overlapping quiet periods.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
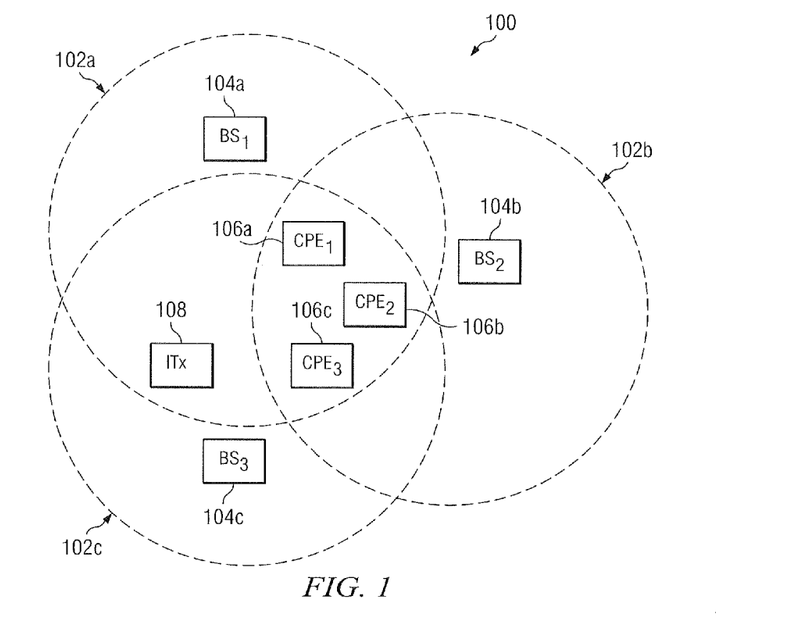
FIG. 1 illustrates an example communication system according to this disclosure.

FIG. 1 illustrates an example communication system 100 according to this disclosure. The embodiment of the system 100 shown in FIG. 1 is for illustration only. Other embodiments of the system 100 could be used without departing from the scope of this disclosure.

As shown in FIG. 1, the system 100 includes multiple cell sites 102a-102c. The cell sites 102a-102c generally include areas where one or more wireless devices may receive wireless service. For example, the cell sites 102a-102c may include areas where wireless devices may receive wireless voice and data services. In some embodiments, each of the cell sites 102a-102c is associated with a different wireless frequency or frequency channel. In this example, the dashed line around each of the cell sites 102a-102c may represent an interference contour, which defines the area in which a cell site may cause interference on the wireless frequency or frequency channel used by the cell site. While shown as being circular in FIG. 1, each of the cell sites 102a-102c may have any suitable interference contour.

Figure 3:
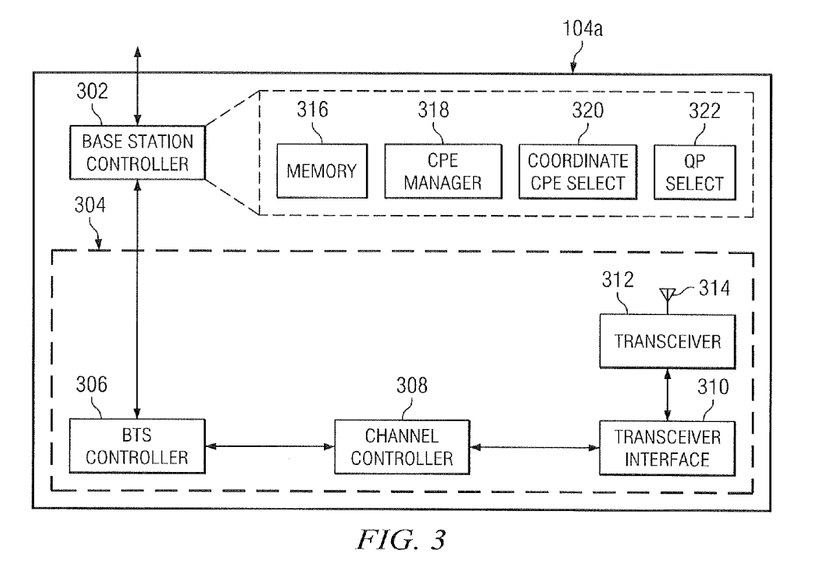
FIG. 3 illustrates an example base station according to this disclosure.

The cell sites 102a-102c include base stations 104a-104c, respectively. Each of the base stations 104a-104c communicates with one or more wireless devices over a wireless medium, such as by using radio frequency (RF) or other wireless technology. For example, the base stations 104a-104c may transmit and receive wireless signals containing voice, data, and/or control signals to and from the wireless devices. In some embodiments, each of the base stations 104a-104c communicates using a different wireless frequency or frequency channel compared to its neighboring base station(s). Each of the base stations 104a-104c includes any suitable structure for communicating wirelessly with one or more wireless devices, including cellular base stations and wireless access points. One example embodiment of a base station is shown in FIG. 3, which is described below. In this example, while the base stations 104a-104c reside at the centers of the cell sites 102a-102c, each of the base stations 104a-104c could reside at any suitable position within its cell site.

Figure 4:
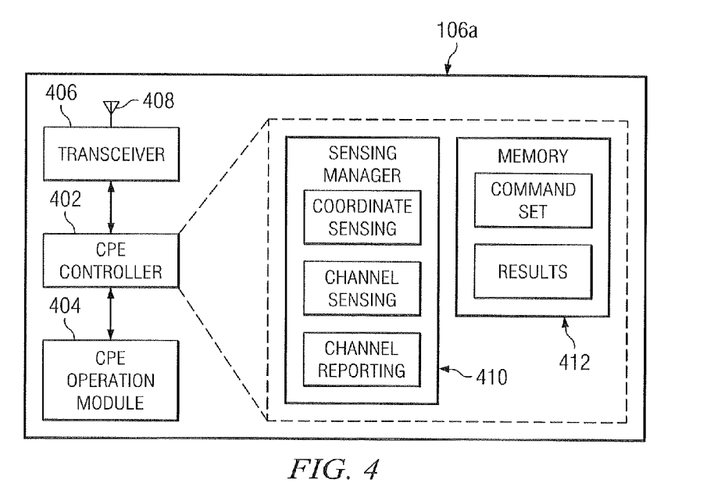
FIG. 4 illustrates an example customer premises equipment (CPE) according to this disclosure.

Among other things, the base stations 104a-104c communicate with customer premises equipment (CPEs) 106a-106c located within the cell sites 102a-102c. Each of the CPEs 106a-106c represents one or more components that provide communication services to a customer. The CPEs 106a-106c could include telephones, modems, set-top boxes, computing devices, or any other or additional components that may receive voice, data, or other services in the system 100. The CPEs 106a-106c could include fixed or mobile devices. Each of the CPEs 106a-106c includes any suitable structure for receiving wireless communication services. One example embodiment of a CPE is shown in FIG. 4, which is described below.

The base stations 104a-104c and the CPEs 106a-106c may use any suitable wireless technology. For example, the base stations 104a-104c and the CPEs 106a-106c may use radio frequency (RF) signals to communicate. As particular examples, the base stations 104a-104c and the CPEs 106a-106c may support the IEEE 802.16, 802.22, or other standard(s) for wireless communications.

An incumbent transmitter (ITx) 108 is shown as residing within the cell sites 102a and 102c. The incumbent transmitter 108 generally represents a transmitting device that has a higher priority to use a wireless frequency or frequency channel in at least one of the cell sites, such as in the cell site 102a (but not necessarily in the cell site 102c). The incumbent transmitter 108 could, for example, represent a television station transmitter or other incumbent user devices.

As described in more detail below, various components in the system 100 perform sensing operations to detect incumbent users (such as the incumbent transmitter 108) or to find available frequencies or channels. For example, the base stations 104a-104c and/or the CPEs 106a-106c may perform "in-band" sensing. "In-band" sensing generally refers to sensing or detecting devices that are transmitting on the same frequency or frequency channel as the sensing device.

Also, the base stations 104a-104c and/or the CPEs 106a-106c may perform "out-band" sensing. "Out-band" sensing generally refers to sensing or detecting devices that are transmitting on a different frequency or frequency channel as the sensing device. The CPEs 106a-106c that perform "out-band" sensing may be referred to as "coordinate CPEs" or "non-coordinate CPEs." A "non-coordinate CPE" generally refers to a CPE that performs "out-band" sensing only on behalf of its serving base station (the base station actually providing service to the CPE). A "coordinate CPE" generally refers to a CPE that performs "out-band" sensing on behalf of its serving base station and at least one assisted base station (a base station not actually providing service to the CPE). Each "coordinate CPE" typically resides (at least temporarily) in an overlapped area that is served by at least two of the base stations 104a-104c. In this example, the CPE 106a could be associated with the base station 104a and represent a coordinate CPE for the base stations 104b-104c, the CPE 106b could be associated with the base station 104b and represent a coordinate CPE for the base stations 104a and 104c, and the CPE 106c could be associated with the base station 104c and represent a coordinate CPE for the base stations 104a-104b. In this document, the phrases "assisted cell site" and "assisted base station" refer to a cell site and a base station, respectively, that are helped by a coordinate CPE served by a different cell site or base station, where the coordinate CPE performs or assists in "out-band" sensing for the assisted cell site or base station. For instance, the CPE 106c could be served by the cell site 102c and perform "out-band" sensing for the cell site 102a, making the cell site 102a an "assisted" cell site.

The "in-band" and "out-band" sensing allow the base stations 104a-104c to identify incumbent users and make modifications to their operations as necessary (such as by switching frequency channels). The "out-band" sensing also allows the base stations 104a-104c to identify frequencies or channels that are potentially available for use (such as channels where no incumbent users are detected). To facilitate more efficient "in-band" and "out-band" sensing, quiet periods of the base stations 104a-104c can be coordinated. A quiet period generally represents a period of time when a base station and its associated wireless devices stop transmitting on a particular frequency or frequency channel. As described in more detail below, the quiet periods of a first base station may allow that first base station (or its associated CPEs) to perform "in-band" sensing operations in their working channels. Also, the quiet periods of other base stations may allow the first base station (or its associated coordinate CPEs) to perform "out-band" sensing operations in their working channels. The quiet periods of the base stations 104a-104c may be coordinated so that they do not overlap with one another (or so that any amount of overlap is acceptable).

As a particular example, consider the base station 104a and its associated CPE 106a in FIG. 1. During quiet periods of the base station 104a, the base station 104a and its associated wireless devices may stop transmitting on its working frequency or frequency channel. During these quiet periods, "in-band" sensing may occur, and the base station 104a and/or the CPE 106a may "listen" to this frequency or frequency channel and attempt to detect any incumbent users. For example, the base station 104a or the CPE 106a could attempt to determine whether any incumbent users are transmitting on the same frequency or frequency channel as the base station 104a. If so, the base station 104a could change its frequency or frequency channel (and, if necessary, the CPE 106a could notify the base station 104a of the interference).

During quiet periods of other (assisted) base stations 104b-104c, each of the base stations 104b-104c and its respective wireless devices may stop transmitting on its respective frequency or frequency channel. During these quiet periods, "out-band" sensing may occur, and the coordinate CPE 106a may "listen" to these frequencies or frequency channels and attempt to detect any incumbent users. For instance, the coordinate CPE 106a could attempt to determine whether any incumbent users are transmitting on the same frequency or frequency channel as any of the other base stations 104b-104c. If so, the coordinate CPE 106a notifies its base station 104a, and the base station 104a may then notify the other base station 104b or 104c.

In this way, the coordinate CPEs may (among other things) help to identify "hidden" incumbent users. A "hidden" incumbent user generally represents a device operating within a cell site that is not detectable by the base station in that cell site or its associated CPEs. In FIG. 1, for example, the incumbent transmitter 108 may be located far away from the base station 104a and the CPE 106a served by the base station 104a in the cell site 102a. As a result, the base station 104a and the CPE 106a may be unable to detect the incumbent transmitter 108. However, the coordinate CPE 106c may be located much closer to the incumbent transmitter 108. During the quiet periods of the base station 104a, the coordinate CPE 106c could perform "out-band" sensing and detect the incumbent transmitter 108 operating on the same frequency channel as the base station 104a. Because the incumbent transmitter 108 resides within the interference contour of the cell site 102a, the incumbent transmitter 108 could be interfered with by the base station 104a. As a result, the coordinate CPE 106c notifies its serving base station (base station 104c in this example) of the interference or the existence of the incumbent transmitter 108. The base station 104c then notifies the base station 104a of the interference or the existence of the incumbent transmitter 108 (either directly or indirectly, such as through a backhaul IP network or a mobile switching center or other component controlling or communicating with the base stations 104a-104c). In response, the base station 104a may change its operation, such as by selecting a new frequency or frequency channel, even though the base station 104a and its associated CPE 106a could not or did not detect the presence of the incumbent transmitter 108.

Although FIG. 1 illustrates one example of a communication system 100, various changes may be made to FIG. 1. For example, the system 100 could include any number of cell sites, base stations, CPEs (whether coordinate or non-coordinate), and incumbent users. Also, the system 100 could be connected to any suitable network(s), such as another wireless network or a data network. In addition, FIG. 1 illustrates one example operational environment in which base stations may coordinate their quiet periods. This functionality could be used in any other communication system.

Figure 2:
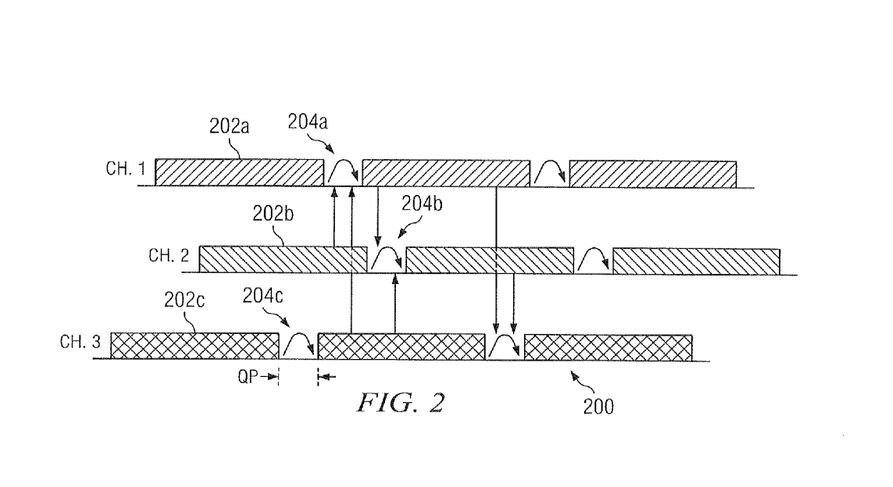
FIG. 2 illustrates an example distributive quiet period sensing in a communication system according to this disclosure.

FIG. 2 illustrates an example distributive quiet period sensing 200 in a communication system according to this disclosure. The distributive quiet period sensing 200 shown in FIG. 2 is for illustration only. Other distributive quiet periods could be used during sensing without departing from the scope of this disclosure. Also, for ease of explanation, the distributive quiet period sensing 200 of FIG. 2 is described with respect to the system 100 of FIG. 1. The distributive quiet period sensing 200 of FIG. 2 could be used with any other suitable system.

As shown in FIG. 2, the distributive quiet period sensing 200 involves three different frequency channels labeled "Ch. 1," "Ch. 2," and "Ch. 3." These three channels could, for example, be associated with the three base stations 104a-104c in FIG. 1. Each of the channels is generally associated with a different frequency or frequency range. Each of the channels is also associated with multiple transmit periods 202a-202c. These transmit periods 202a-202c denote periods of time when the channels are in use by the base stations 104a-104c and their associated wireless devices, such as when the base stations 104a-104c and their associated wireless devices are transmitting wireless signals on their associated working frequency channels. Each of the channels is further associated with multiple quiet periods 204a-204c. These quiet periods 204a-204c denote periods of time when the channels are not in use by the base stations 104a-104c and their associated wireless devices, meaning periods of time when the base stations 104a-104c and their associated wireless devices are not transmitting wireless signals on their associated frequency channels.

In FIG. 2, the curved lines that appear within each channel's quiet periods represent "in-band" sensing that occurs during those quiet periods. For example, "in-band" sensing may occur during each quiet period 204a in "Channel 1," and the base station 104a and/or its associated CPE 106a may listen to "Channel 1" and attempt to identify any incumbent users on "Channel 1." Similarly, "in-band" sensing may occur during each quiet period 204b in "Channel 2," and the base station 104b and/or its associated CPE 106b may listen to "Channel 2" and attempt to identify any incumbent users on "Channel 2." Similar operations may occur during the quiet periods 204c in "Channel 3." In particular embodiments, the length of each quiet period 204a-204c is selected to be the minimal amount of time necessary to sense in-band communications. This minimal amount of time may help to reduce the impact of the quiet periods 204a-204c on any quality of service (QoS) requirements in the system 100.

The straight lines that occur between channels in FIG. 2 represent "out-band" sensing that occurs. For example, "out-band" sensing may be performed by the coordinate CPEs 106b-106c (which normally operate using "Channel 2" and "Channel 3," respectively) during each quiet period 204a in "Channel 1." This allows the coordinate CPEs 106b-106c to detect incumbent users operating on the same frequency channel as the base station 104a. Similarly, "out-band" sensing may be performed by the coordinate CPEs 106a and 106c (which normally operate using "Channel 1" and "Channel 3," respectively) during each quiet period 204b in "Channel 2." In addition, "out-band" sensing may be performed by the coordinate CPEs 106a-106b (which normally operate using "Channel 1" and "Channel 2," respectively) during each quiet period 204c in "Channel 3." When a coordinate CPE detects an incumbent user during "out-band" sensing, the coordinate CPE may inform its serving base station, which may then notify the appropriate assisted base station (the base station in the cell site using the same frequency or channel as the incumbent user).

Because the quiet periods 204a-204c of the channels do not overlap with one another, the system 100 may operate more effectively or efficiently in identifying incumbent users. If the quiet periods 204a-204c were completely synchronized (all quiet periods start and stop at the same times), the base stations 104a-104c and their associated CPEs 106a-106c could perform "in-band" sensing during the synchronized quiet periods 204a-204c. However, the coordinate CPEs 106a-106c may be unable to perform "out-band" sensing during any of the quiet periods 204a-204c for their assisted base stations. By coordinating the quiet periods 204a-204c so that they do not overlap, a coordinate CPE can perform "in-band" sensing during the quiet periods of its serving base station and "out-band" sensing for its assisted base station(s) during the quiet periods of the assisted base station(s).

Although FIG. 2 illustrates one example of a distributive quiet period sensing 200 in a communication system, various changes may be made to FIG. 2. For example, the use of three channels is for illustration only, and any other suitable number of channels can be involved in the quiet period coordination. Also, the exact placement of the quiet periods 204a-204c in FIG. 2 is for illustration only, and the quiet periods could be arranged in any suitable non-overlapping manner. It should be noted that two quiet periods may be "non-overlapping" even when one quiet period ends and another quiet period begins at the same time. It should also be noted that, in other embodiments, a small amount of overlap could be allowed between two quiet periods in two different frequencies or channels. In addition, the quiet periods may or may not have constant time periods, and the length between quiet periods may or may not be constant.

FIG. 3 illustrates an example base station 104a according to this disclosure. The embodiment of the base station 104a shown in FIG. 3 is for illustration only. Other embodiments of the base station 104a could be used without departing from the scope of this disclosure. Also, for ease of explanation, the base station 104a of FIG. 3 is described with respect to the system 100 of FIG. 1. The base station 104a of FIG. 3 could be used with any other suitable system.

As shown in FIG. 3, the base station 104a includes a base station controller 302 and one or more base transceiver subsystems 304. The base station controller 302 generally controls the overall operation of the base station 104a. The base station controller 302 could, for example, control wireless communication resources in the base station 104a, such as the base transceiver subsystems 304. The base station controller 302 includes any hardware, software, firmware, or combination thereof for controlling a base station.

Each base transceiver subsystem 304 generally includes components used for wireless communications to and from the base station 104a. In this example, each base transceiver subsystem 304 includes a base transceiver subsystem (BTS) controller 306, a channel controller 308, a transceiver interface 310, a transceiver 312, and an antenna 314. The BTS controller 306 generally controls the base transceiver subsystem 304 and communicates with the base station controller 302. The BTS controller 306 includes any hardware, software, firmware, or combination thereof for controlling a base transceiver subsystem.

During wireless communications, the channel controller 308 generally controls communication channels for communicating with wireless devices, such as forward (outbound) and reverse (inbound) channels. The channel controller 308 includes any hardware, software, firmware, or combination thereof for controlling communication channels in a base transceiver subsystem.

The transceiver interface 310 acts as an interface between the communication channels and the transceiver 312. The transceiver interface 310 includes any suitable structure providing an interface to a transceiver. The transceiver 312 includes any suitable structure supporting wireless transmission of outbound signals and wireless reception of inbound signals, such as an RF transceiver. As a particular example, the transceiver 312 could include amplifiers, filters, and analog-to-digital converters for processing inbound signals and amplifiers, filters, and digital-to-analog converters for processing outbound signals. The antenna 314 represents any suitable structure for transmitting and receiving wireless signals, such as an RF antenna or antenna array.

In this example, the base station controller 302 includes or supports various components or functions for the coordination of quiet periods with other base stations (such as base stations 104b-104c in FIG. 1). Also, the base station controller 302 includes or supports various components or functions for controlling "in-band" and "out-band" sensing by CPEs associated with the base station 104a (such as CPE 106a in FIG. 1). For example, the base station controller 302 includes or has access to a memory 316, which can be used to store instructions or data used, generated, or collected by the base station controller 302. As a particular example, the memory 316 could be used to store information associated with the quiet periods used by the base station 104a and information associated with the quiet periods used by other base stations 104b-104c. The memory 316 could also be used to store information associated with one or more coordinate CPEs currently supporting other assisted base stations, such as an identity and location of a coordinate CPE. The memory 316 could store any other or additional information. The memory 316 includes any suitable volatile and/or non-volatile storage and retrieval device or devices.

The base station controller 302 also includes or has access to a CPE manager 318. The CPE manager 318 supports interaction with various CPEs by the base station controller 302. For example, the CPE manager 318 could initiate the collection of various information, such as location information, from the CPEs. The CPE manager 318 could also initiate incumbent user sensing by the CPEs by initiating "in-band" and/or "out-band" sensing by its associated CPEs via the appropriate command(s). The CPE manager 318 could further initiate "out-band" sensing by coordinate CPEs for other (assisted) base stations during the assisted base stations' quiet periods via the appropriate command(s). As a particular example, the CPE manager 318 could send a channel sensing command to a CPE, where the channel sensing command identifies when sensing is to occur, the channel on which sensing is to occur, and a sensing contour (the range at which sensing is to occur). The same or similar commands could be used for "in-band" sensing, "out-band" sensing for the serving base station, and "out-band" sensing for an assisted base station. The CPE manager 318 could further initiate reporting of the results of the incumbent user sensing by the CPEs via the appropriate command(s). The results could represent any suitable information, such as an identification of all incumbent users sensed and the frequency or channel used by each sensed incumbent user. The CPE manager 318 includes any hardware, software, firmware, or combination thereof for interacting with and controlling one or more CPEs.

The base station controller 302 further includes or has access to a coordinate CPE selector 320. The coordinate CPE selector 320 allows the base station controller 302 to select one or more of its associated CPEs for use as coordinate CPEs. For example, each associated CPE being served by the base station 104a could report its position to that base station 104a. Also, the base station 104a could be provided with an interfering contour associated with a neighboring base station 104b or 104c. The interfering contour generally defines the area where two base stations' coverage areas overlaps. The coordinate CPE selector 320 can use the reported positions of the CPEs and the interfering contour of each assisted base station 104b or 104c to select coordinate CPEs, which can be used (among other things) to perform "in-band" and/or "out-band" sensing for the serving base station 104a and "out-band" sensing for the assisted base station 104b or 104c. As a particular example, the coordinate CPE selector 320 could identify one or more of its associated CPEs that reside within the area where two base stations' coverage areas overlap, and the coordinate CPE selector 320 could use at least one of those CPEs as a coordinate CPE. The coordinate CPE selector 320 includes any hardware, software, firmware, or combination thereof for identifying or selecting coordinate CPES.

In addition, the base station controller 302 includes or has access to a quiet period (QP) selector 322. The quiet period selector 322 operates to select quiet periods that can be used by the base station 104a to support "in-band" and "out-band" sensing. The quiet period selector 322 could, for example, identify a quiet period start time and a quiet period length for the base station 104a, and then compare that information to the quiet period start times and quiet period lengths of other base stations 104b-104c. If overlap is not detected in the quiet periods, the base station 104a may use the quiet period start time and the quiet period length identified by the quiet period selector 322. Otherwise, if overlap is detected, the quiet period selector 322 can take steps to ensure that the quiet periods used by the base station 104a do not overlap with other quiet periods of other base stations 104b-104c. The quiet period selector 322 could also determine whether an amount of overlap between the quiet periods is acceptable, such as whether the amount of overlap exceeds an acceptable threshold. The quiet period selector 322 includes any hardware, software, firmware, or combination thereof for identifying a quiet period for a base station.

Although FIG. 3 illustrates one example of a base station 104a, various changes may be made to FIG. 3. For example, the functional division shown in FIG. 3 is for illustration only. Various components in FIG. 3 could be combined or omitted and additional components could be added according to particular needs. As a particular example, the components 318-322 of the base station could reside on the memory 316 (such as when they represent software or firmware). Also, various components or functions shown as residing within the base station 104a could reside in other components, such as within a coordinate CPE 106a. In addition, FIG. 3 illustrates one example base station capable of coordinating its quiet periods with other base stations. This functionality could be used in any other device.

FIG. 4 illustrates an example CPE 106a in accordance with this disclosure. The embodiment of the CPE 106a shown in FIG. 4 is for illustration only. Other embodiments of the CPE 106a could be used without departing from the scope of this disclosure. Also, for ease of explanation, the CPE 106a of FIG. 4 is described with respect to the system 100 of FIG. 1. The CPE 106a of FIG. 4 could be used with any other suitable system.

As shown in FIG. 4, the CPE 106a includes a CPE controller 402 and a CPE operation module 404. The CPE controller 402 generally controls the overall operation of the CPE 106a. The CPE controller 402 could, for example, control wireless communications with a base station, such as base station 104a. As described below, the CPE controller 402 could also support the collection of various information during "in-band" and "out-band" sensing for its serving base station. In addition, if acting as a coordinate CPE, the CPE controller 402 could support the collection of various information during "out-band" sensing for an assisted base station. The CPE controller 402 includes any hardware, software, firmware, or combination thereof for controlling a CPE.

The CPE operation module 404 performs various operations associated with the CPE 106a. For example, the CPE operation module 404 could interface and interact with telephones, fax machines, and computing devices in a residence or other location, allowing the devices to receive communication services via the CPE 106a. The CPE operation module 404 could perform any of a wide variety of functions, depending on the particular implementation and purpose of the CPE 106a.

A transceiver 406 and an antenna 408 facilitate wireless communications between the CPE 106a and, for example, the base station 104a. The transceiver 406 and the antenna 408 may also facilitate wireless detection of incumbent users operating within range of the CPE 106a. The transceiver 406 includes any suitable structure supporting wireless transmission of outbound signals and wireless reception of inbound signals, such as an RF transceiver. The antenna 408 represents any suitable structure for transmitting and receiving wireless signals, such as an RF antenna or antenna array.

In this example, the CPE controller 402 includes or supports various components or functions for "in-band" and "out-band" sensing on behalf of its serving base station (such as base station 104a) and "out-band" sensing on behalf of an assisted base station (such as base station 104b or 104c). For example, the CPE controller 402 includes or has access to a sensing manager 410. Among other things, the sensing manager 410 can perform coordinate sensing, which may allow the sensing manager 410 to determine the location of the CPE 106a. The sensing manager 410 may use any suitable technique to identify its location, such as GPS. The sensing manager 410 can also perform channel sensing, which could involve sensing whether any incumbent users are transmitting on a specified frequency or frequency channel during a quiet period of one or more base stations. The sensing manager 410 could perform "in-band" sensing during quiet periods of its serving base station 104a and "out-band" sensing during quiet periods of its assisted base stations 104b-104c. The channel sensing could be invoked based on a channel sensing command received from the serving base station 104a. Any suitable information can be collected during the channel sensing, such as the identity of an incumbent user and the frequency or channel being used by the incumbent user. In addition, the sensing manager 410 can perform channel reporting, which can involve reporting information about any incumbent users detected during the channel sensing. The sensing manager 410 includes any hardware, software, firmware, or combination thereof for sensing and reporting incumbent users during one or more base stations' quiet periods.

The CPE controller 402 also includes or has access to a memory 412, which can be used to store instructions or data used, generated, or collected by the CPE controller 402. As a particular example, the memory 412 could be used to store information defining a command set, which identifies the valid commands that can be received by the CPE 106a. The memory 412 could also be used to store information associated with the identified location of the CPE 106a. The memory 412 could further be used to store information associated with incumbent users detected during channel sensing, which could be retrieved from the memory 412 during channel reporting. The memory 412 could store any other or additional information. The memory 412 includes any suitable volatile and/or non-volatile storage and retrieval device or devices.

Although FIG. 4 illustrates one example of a coordinate CPE 106a, various changes may be made to FIG. 4. For example, the functional division shown in FIG. 4 is for illustration only. Various components in FIG. 4 could be combined or omitted and additional components could be added according to particular needs. As a particular example, the components 410 of the CPE could reside on the memory 412 (such as when they represent software or firmware) Also, various components or functions shown as residing within the CPE 106a could reside in other components, such as within a base station 104a. In addition, FIG. 4 illustrates one example of a CPE capable of sensing incumbent users during one or more base stations' quiet periods and reporting that information. This functionality could be used in any other device.

Figure 5:
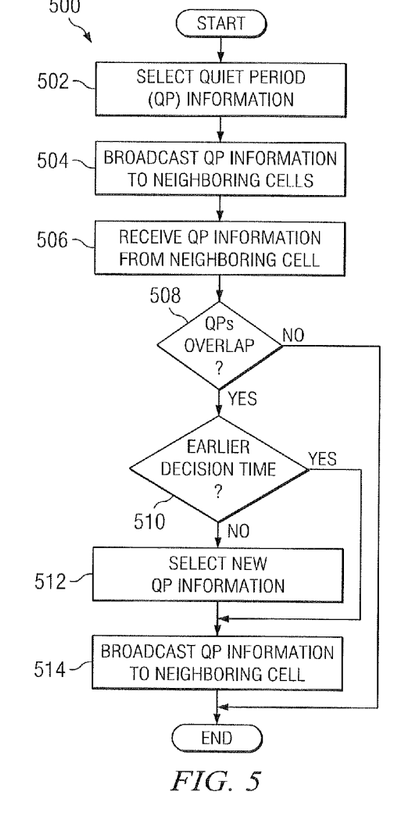
FIG. 5 illustrates an example method for selecting non-overlapping quiet periods in a communication system according to this disclosure.

FIG. 5 illustrates an example method 500 for selecting non-overlapping quiet periods in a communication system according to this disclosure. The embodiment of the method 500 shown in FIG. 5 is for illustration only. Other embodiments of the method 500 could be used without departing from the scope of this disclosure. Also, for ease of explanation, FIG. 5 is described with respect to the base station 104a operating in the system 100 of FIG. 1. The method 500 could be used with any suitable device and in any suitable system.

A base station 104a selects or determines quiet period information for its quiet periods at step 502. This may include, for example, the quiet period selector 322 in the base station 104a selecting the start time for its quiet periods and the interval between its quiet periods. The quiet period selector 322 could also select other attributes or characteristics of its quiet periods, such as the length of its quiet period. In other embodiments, various attributes or characteristics of the quiet periods, such as their length or the interval between periods, could be fixed.

The base station 104a broadcasts its quiet period information to neighboring cells at step 504. This may include, for example, the quiet period selector 322 providing information related to its identified quiet periods to a BTS controller 306 for transmission via an antenna 314. The quiet period selector 322 could provide any suitable information for transmission. The information could, for instance, include the identified start time of the quiet periods, the interval between quiet periods, the length of each quiet period, and the time at which the quiet period information was identified (referred to as the base station's "decision time"). Any neighboring base stations 104b-104c may receive the quiet period information directly from the base station 104a or indirectly, such as via one or more bridge CPEs (CPEs capable of relaying information between base stations) or other devices (such as backhaul IP networks).

The base station 104a receives quiet period information from one or more neighboring cells at step 506. This may include, for example, the base station 104a receiving quiet period information from other base stations 104b-104c through one or more of its base transceiver subsystems 304. The information from the neighboring cells could include the identified start time of a neighboring base station's quiet periods, the length of the neighboring base station's quiet periods, the interval between the neighboring base station's quiet periods, and the neighboring base station's decision time. The information could be received directly from the neighboring base stations 104b-104c or indirectly, such as via one or more bridge CPEs or other devices (such as backhaul IP networks).

The base station 104a determines if its quiet periods overlap with any of the quiet periods of its neighboring cells at step 508. This may include, for example, the quiet period selector 322 determining whether any of the quiet periods of the base station 104a overlap with any of the quiet periods of the neighboring base station(s) 104b-104c. The quiet period selector 322 can make this determination using the start time, the interval between quiet periods, and the length of its own quiet periods, along with the start time(s), the interval(s), and the length(s) of the other base station(s)' quiet periods. If no overlap is present, the method 500 ends. At this point, the base stations need no additional coordination to have non-overlapping quiet periods.

If any of the quiet periods of the base station 104a overlap with any of the quiet periods of its neighboring cells, the base station 104a determines whether it has an earlier decision time than the neighboring cells at step 510. This may include, for example, the quiet period selector 322 comparing the decision time of the base station 104a against the decision time(s) of the other base station(s) 104b-104c. In the illustrated embodiment, the base station with the earlier decision time has priority.

If the base station 104a does not have an earlier decision time, the base station 104a selects new quiet period information at step 512. The new quiet period information can be selected in any suitable manner, such as by adding a predetermined or random amount of time to the previously-determined start time or by selecting an entirely new start time (without reference to the previously-determined start time). The base station 104a then rebroadcasts its quiet period information to one or more neighboring cells at step 514. If the base station 104a has an earlier decision time at step 510, the base station 104a rebroadcasts the same quiet period information (the same information as in step 504) at step 514. The rebroadcast may or may not contain an indication that the base station 104a has an earlier decision time. In this way, the base stations can interact as needed to coordinate their quiet periods so that they are not overlapping.

Although FIG. 5 illustrates one example of a method for selecting non-overlapping quiet periods in a communication system, various changes may be made to FIG. 5. For example, while shown as a series of steps, various steps in FIG. 5 could overlap, occur in a different order, or occur multiple times. As a particular example, the base stations could rebroadcast their quiet time information periodically or multiple times, allowing the base stations to maintain coordination among their quiet periods. Also, the base stations could allow a small amount of overlap between their quiet periods. In these embodiments, the base stations could, for example, determine whether the amount of overlap falls below a threshold value at step 508.

Figure 6:
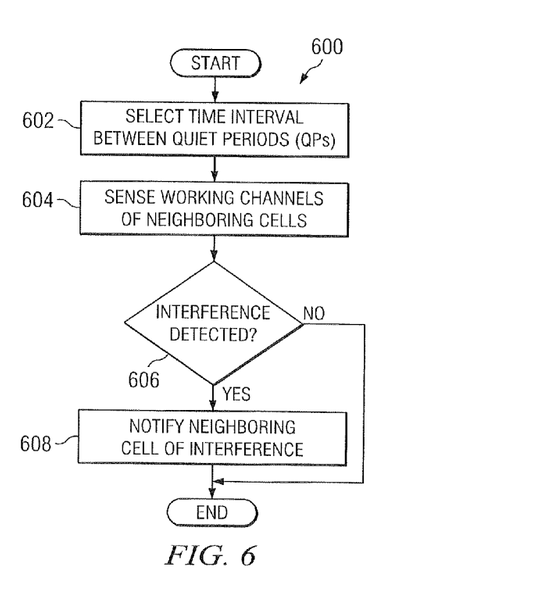
FIG. 6 illustrates an example method for sensing incumbent users during non-overlapping quiet periods in a communication system according to this disclosure.

FIG. 6 illustrates an example method 600 for sensing incumbent users during non-overlapping quiet periods in a communication system according to this disclosure. The embodiment of the method 600 shown in FIG. 6 is for illustration only. Other embodiments of the method 600 could be used without departing from the scope of this disclosure. Also, for ease of explanation, FIG. 6 is described with respect to the base station 104a operating along with its associated coordinate CPE 106a in the system 100 of FIG. 1. The method 600 could be used with any suitable device(s) and in any suitable system.

A base station 104a selects a time interval between its quiet periods at step 602. This could include, for example, the quiet period selector 322 identifying a time period between the start of one quiet period and the start of a consecutive quiet period. In some embodiments, all of the base stations in a system use the same time interval.

The base station 104a and/or its associated coordinate CPE 106a performs channel sensing on one or more working channels of one or more neighboring cells at step 604. This could include, for example, the base station 104a and its associated coordinate CPE 106a performing channel sensing during the quiet periods of one or more neighboring base stations 104b-104c. The quiet periods of the neighboring base station(s) allow the base station 104a and/or its associated coordinate CPE 106a to sense incumbent users operating on the frequency/frequencies or channel/channels of the neighboring base station(s). During this step, the coordinate CPE 106a may or may not be required to stop its own transmissions during the channel sensing. For instance, the coordinate CPE 106a may stop normal transmissions by its transceiver 406 and use the transceiver 406 to perform channel sensing during the neighboring base stations' quiet periods. The coordinate CPE 106a could also include a sensing receiver that can be used during channel sensing independent of the transceiver 406 (allowing the transceiver 406 to continue normal transmissions during channel sensing).

The base station 104a and/or its associated coordinate CPE 106a determines whether interference has been detected during the channel sensing at step 606. This could include, for example, the coordinate CPE 106a determining whether any incumbent users were detected during channel sensing. These incumbent users may represent devices transmitting on the same frequency or channel as a neighboring base station, meaning the neighboring base station could be interfering with the incumbent users.

If an incumbent user is detected, one or more neighboring cells are notified of the interference at step 608. This may include, for example, the coordinate CPE 106a informing its serving base station 104a that it has detected an incumbent user that is being interfered with by the neighboring cell(s). This may also include the base station 104a notifying one or more neighboring base stations in those cells of the detected interference. The notification could be direct (from the base station 104a to another base station) or indirect (from the base station 104a to at least one other component such as a bridge CPE and then to the other base station, or through a backhaul IP network).

In this way, one or more neighboring base stations can modify their operation when an incumbent user is detected. For example, the one or more neighboring base stations could select different frequencies or frequency channels to reduce or eliminate interference caused to the incumbent user.

Although FIG. 6 illustrates one example of a method 600 for sensing incumbent users during non-overlapping quiet periods in a communication system, various changes may be made to FIG. 6. For example, while shown as a series of steps, various steps in FIG. 6 could overlap, occur in a different order, or occur multiple times. As a particular example, the base station and its coordinate CPE could repeatedly test for interference, such as during each quiet period of the base station's neighboring cells. Also, the base stations could allow a small amount of overlap between their quiet periods. In addition, FIG. 6 has illustrated operations that may occur during "out-band" sensing by the base station 104a and CPE 106a for an assisted base station. Other operations may occur at the base station 104a and CPE 106a during "in-band" sensing and "out-band" sensing for the serving base station 104a.

Figure 7:
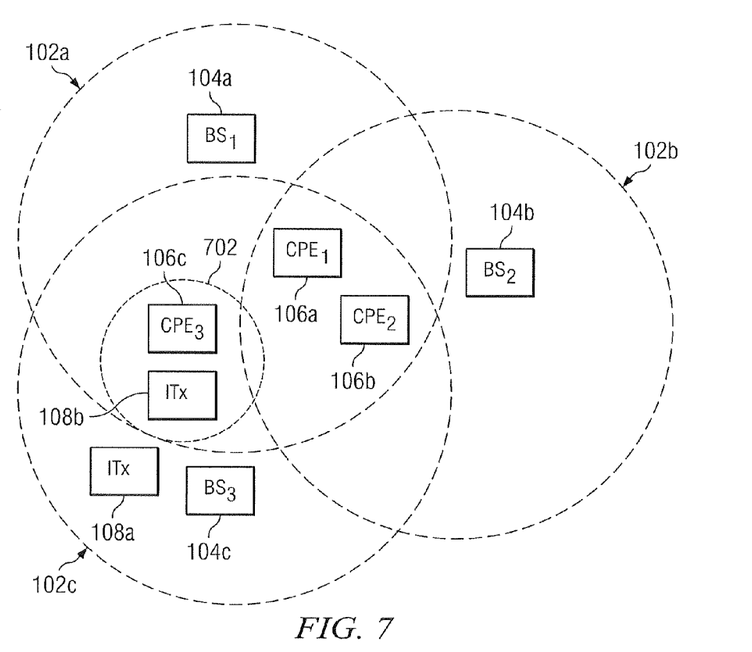
FIG. 7 illustrates an example technique for false detection avoidance in a communication system according to this disclosure.

FIG. 7 illustrates an example technique for false detection avoidance in a communication system according to this disclosure. The technique shown in FIG. 7 is for illustration only. Other techniques could be used to reduce or eliminate false detections without departing from the scope of this disclosure. Also, the technique in FIG. 7 could be used with any suitable device(s) and in any suitable system.

Depending on the arrangement of coordinate CPEs and an incumbent user in a system, one or more of the coordinate CPEs could provide a false interference detection. In other words, a coordinate CPE could indicate that interference with an incumbent user has been detected even when there is little or no actual interference. For example, an incumbent transmitter 108a in FIG. 7 is located completely outside of the interference contour of the cell site 102a, so the base station 104a does not interfere with the incumbent transmitter 108a. However, the incumbent transmitter 108a could still be within range of the CPE 106c (especially if the CPE 106c was moved down closer to the interference contour of the cell site 102a). As a result, the CPE 106c could detect the incumbent transmitter 108a during the quiet periods of the base station 104a. This could lead the CPE 106c to indicate (falsely) that the incumbent transmitter 108a is being interfered with by the base station 104a.

To reduce or eliminate false detections, the positions of the CPEs 106a-106c can be used to select appropriate coordinate CPES. For example, the system could operate so that a coordinate CPE represents a CPE that is not near the interference contour of the cell site that the CPE is assisting. In other words, a CPE may not be selected to perform channel sensing for an assisted base station if that CPE is near the boundary of that base station's interference contour.

The detection distance of a CPE selected for use as a coordinate CPE can also be adjusted to avoid false interference detection. For example, as shown in FIG. 7, a detection distance 702 of the CPE 106c can be adjusted so that most or all of the detection area (the area within the circle representing the detection distance 702) is within the boundary of the assisted cell site (cell site 102a). In other words, the detection distance 702 of the CPE 106c can be adjusted so that the CPE 106c generally, substantially, or only detects incumbent users 108b within the cite site that the CPE 106c is assisting. In this way, a coordinate CPE may detect only incumbent users 108b that are actually within the interference contour of an assisted cell site.

Although FIG. 7 illustrates one example of a technique for false detection avoidance in a communication system, various changes may be made to FIG. 7. For example, any other suitable technique could be used to avoid false detection of incumbent users. Also, any additional properties could be used and/or adjusted instead of or in addition to the position and detection range of a coordinate CPE.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video/versatile disc (DVD), or any other type of memory. Example computer readable mediums can be randomly accessed, volatile, non-volatile, removable, or non-removable. A computer readable medium could be provided from within a system or device, or the computer readable medium can be provided external to a system or device, as well.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method comprising:
identifying one or more first quiet periods associated with a first base station;
identifying one or more second quiet periods associated with a second base station;
determining whether an amount of overlap between the first and second quiet periods exceeds a threshold;
if the amount of overlap exceeds the threshold, selecting a different start time of the first or second quiet periods such that the overlap is reduced; and
using the first and second quiet periods to initiate sensing of wireless devices when the amount of overlap between the first and second quiet periods does not exceed the threshold.

2. The method of claim 1, wherein the threshold is a value indicating that no overlap exists between the first and second quiet periods.

3. The method of claim 1, further comprising:
broadcasting information associated with the one or more first quiet periods from the first base station, wherein identifying the one or more second quiet periods comprises receiving information associated with the one or more second quiet periods broadcast by the second base station.

4. The method of claim 3, wherein the first base station is associated with a first decision time related to the one or more first quiet periods and the second base station is associated with a second decision time related to the one or more second quiet periods, the method further comprising:
determining whether the first decision time is earlier than the second decision time when the amount of overlap between the first and second quiet periods exceeds the threshold.

5. The method of claim 4, further comprising:
when the first decision time is earlier than the second decision time, rebroadcasting the information associated with the one or more first quiet periods from the first base station; and
when the first decision time is later than the second decision time, identifying one or more new first quiet periods associated with the first base station and broadcasting information associated with the one or more new first quiet periods from the first base station.

6. The method of claim 1, wherein the first base station is associated with a first frequency or frequency channel and the second base station is associated with a second frequency or frequency channel.

7. The method of claim 6, wherein using the first and second quiet periods to sense the wireless devices comprises:
sensing wireless devices that operate using the first frequency or frequency channel during the one or more first quiet periods; and
sensing wireless devices that operate using the second frequency or frequency channel during the one or more second quiet periods.

8. The method of claim 1, wherein using the first and second quiet periods to sense the wireless devices comprises sensing the wireless devices at one or more of: the first base station and a coordinate device associated with the first base station.

9. The method of claim 8, wherein the coordinate device comprises a coordinate customer premises equipment.

10. The method of claim 8, wherein sensing the wireless devices comprises sensing the wireless devices at the coordinate device, the coordinate device served by the first base station and assisting the second base station, the method further comprising:

selecting the coordinate device from among a plurality of devices, the coordinate device selected based on the coordinate device being located in a coverage area served by both the first and second base stations and away from an interference contour associated with the second base station.

11. The method of claim 8, wherein sensing the wireless devices comprises sensing the wireless devices at the coordinate device, the coordinate device served by the first base station and assisting the second base station, the method further comprising:

setting a detection distance of the coordinate device, the detection distance set so that a detection area associated with the coordinate device is substantially within an interference contour associated with the second base station.

12. An apparatus comprising:
a quiet period selector configured to:
identify one or more first quiet periods associated with a first base station and to identify one or more second quiet periods associated with a second base station, the quiet period selector also configured to determine whether an amount of overlap between the first and second quiet periods exceeds a threshold; and
if the amount of overlap exceeds the threshold, select a different start time of the first or second quiet periods such that the overlap is reduced; and
a manager configured to initiate sensing of wireless devices using the first and second quiet periods when the amount of overlap between the first and second quiet periods does not exceed the threshold.

13. The apparatus of claim 12, wherein the threshold is a value indicating that no overlap exists between the first and second quiet periods.

14. The apparatus of claim 12, further comprising:
a transceiver configured to broadcast the information identifying the one or more first quiet periods when the one or more first quiet periods are identified and to receive the information identifying the one or more second quiet periods.

15. The apparatus of claim 14, wherein the first base station is associated with a first decision time related to the one or more first quiet periods and the second base station is associated with a second decision time related to the one or more second quiet periods, and
wherein the quiet period selector is further configured to determine whether the first decision time is earlier than the second decision time when the amount of overlap between the first and second quiet periods exceeds the threshold.

16. The apparatus of claim 15, wherein the quiet period selector is further configured to:
initiate rebroadcasting of the information identifying the one or more first quiet periods via the transceiver when the first decision time is earlier than the second decision time; and
identify one or more new first quiet periods associated with the first base station and initiate broadcasting of information identifying the one or more new first quiet periods via the transceiver when the first decision time is later than the second decision time.

17. The apparatus of claim 12, wherein a first frequency or frequency channel is associated with the first base station and a second frequency or frequency channel is associated with the second base station, and
wherein the manager is configured to initiate sensing of (i) wireless devices that operate using the first frequency or frequency channel during the one or more first quiet periods and (ii) wireless devices that operate using the second frequency or frequency channel during the one or more second quiet periods.

18. The apparatus of claim 12, wherein the apparatus resides within the first base station, and
wherein the manager is configured to initiate sensing of the wireless devices by a coordinate device associated with the first base station.

19. The apparatus of claim 18, wherein the coordinate device is served by the first base station and assists the second base station, and
wherein the apparatus further comprises a selector configured to select the coordinate device from among a plurality of devices, the coordinate device selected based on the coordinate device being located in a coverage area served by both the first and second base stations and away from an interference contour associated with the second base station.

20. The apparatus of claim 18, wherein the coordinate device is served by the first base station and assists the second base station, and
wherein the apparatus is further configured to set a detection distance of the coordinate device, the detection distance set so that a detection area associated with the coordinate device is substantially within an interference contour associated with the first base station.

21. The apparatus of claim 12, further comprising:
a memory configured to store information identifying the one or more first quiet periods associated with the first base station and information identifying the one or more second quiet periods associated with the second base station.

22. A computer program embodied on a non-transitory computer readable medium, the computer program comprising computer readable program code, when executed on a processor, operable to cause the processor to at least:
identify one or more first quiet periods associated with a first base station;
identify one or more second quiet periods associated with a second base station;
determine whether an amount of overlap between the first and second quiet periods exceeds a threshold;
if the amount of overlap exceeds the threshold, selecting a different start time of the first or second quiet periods such that the overlap is reduced; and
initiate sensing of wireless devices using the first and second quiet periods when the amount of overlap between the first and second quiet periods does not exceed the threshold.

23. The computer program of claim 22, threshold is a value indicating that no overlap exists between the first and second quiet periods.

24. An apparatus comprising:
a manager configured to perform in-band sensing of wireless devices during one or more first quiet periods associated with a first base station and out-band sensing of wireless devices during one or more second quiet periods associated with a second base station, the first and second quiet periods comprising non-overlapping quiet periods; and a coordinate device associated with the first base station and configured for selection according to a detection area associated with the coordinate device that is substantially within an interference contour associated with the first base station, wherein the wireless manager is configured to use the first and second quiet periods to sense the wireless devices at a coordinate device served by the first base station and assisting the second base station, and wherein the apparatus is configured to set a detection distance of the coordinate device, the detection distance set so that a detection area associated with the coordinate device is substantially within an interference contour associated with the second base station.

25. The apparatus of claim 24, further comprising:

a transceiver configured to communicate wirelessly with the first base station.

26. A method comprising:

performing, using a coordinate device associated with a first base station, in-band sensing of wireless devices during one or more first quiet periods associated with a first base station; and performing, using the coordinate device, out-band sensing of wireless devices during one or more second quiet periods associated with a second base station, the first and second quiet periods comprising non-overlapping quiet periods, wherein the coordinate device is selected according to a detection area associated with the coordinate device that is substantially within an interference contour associated with the first base station.

27. The method of claim 26, further comprising:

communicating wirelessly with the first base station.

28. A computer program embodied on a non-transitory computer readable medium, the computer program comprising computer readable program code, when executed on a processor, operable to cause the processor to at least:

perform, using a coordinate device associated with a first base station, in-band sensing of wireless devices during one or more first quiet periods associated with a first base station; and perform, using the coordinate device, out-band sensing of wireless devices during one or more second quiet periods associated with a second base station, the first and second quiet periods comprising non-overlapping quiet periods, wherein the coordinate device is selected according to a detection area associated with the coordinate device that is substantially within an interference contour associated with the first base station.

* * * * *